Aug. 21, 1956  H. J. M. VAN EMBDEN  2,759,252
METHOD FOR SEALING AN IRON MEMBER TO A GLASS PART
Filed Aug. 15, 1952

INVENTOR
HENDRIK JOHANNES MEERKAMP
VAN EMBDEN
BY
*Fred M Vogel*
AGENT

United States Patent Office 2,759,252
Patented Aug. 21, 1956

2,759,252

METHOD FOR SEALING AN IRON MEMBER TO A GLASS PART

Hendrik Johannes Meerkamp Van Embden, Eindhoven, Netherlands, assignor to Hartford National Bank and Trust Company, Hartford, Conn., as trustee; patent dedicated to the Public insofar as it relates to lamps and lamp parts to the extent stated in document recorded in the United States Patent Office April 13, 1954

Application August 15, 1952, Serial No. 304,466

Claims priority, application Netherlands September 26, 1951

2 Claims. (Cl. 29—472.9)

This invention relates to a method for sealing an iron member to a glass part and, in particular, relates to a method for sealing an iron electrode into a glass wall of an electric discharge tube.

Heretofore, in order to seal an iron member to a conventional glass part, such as lead glasses, it was necessary to incorporate into the iron member about 25 to 30% of chromium because a chrome-iron alloy has a coefficient of expansion substantially similar to that of glass and because the glass adheres satisfactorily to the chrome-iron surface. However, such a technique has the disadvantage that it becomes relatively expensive to add so much chromium to the iron before satisfactorily sealing could be obtained.

The main object of the present invention is to provide a method for satisfactorily sealing an iron member to a glass part without adding about 25% to 30% of chromium to the iron member.

This and other objects of the invention will be best understood from the following description.

According to the invention, the iron member is provided with a superficial layer of chrome-iron at the area thereof which is to be sealed to the glass part. Thereafter, the iron underlying the chrome-iron surface layer at least at the sealing area is removed and the remaining chrome-iron layer or layers is sealed to the glass. With such a method, strong, tight seals between the iron member and the glass part are obtained employing only an extremely small quantity of chromium.

Where the iron member is provided with chrome-iron layers on opposite surfaces thereof, the iron between the opposing layers may be removed and the thus-formed two layers of chrome-iron may be sealed to the glass part. Alternatively, one chrome-iron layer and the underlying iron may be removed and the remaining chrome-iron layer sealed to the glass part. The iron is preferably removed by a process known as etching in which the iron is chemically dissolved by an acid, e. g. hydrochloride acid.

The invention will now be described with reference to the accompanying drawing in which.

Figure 1:
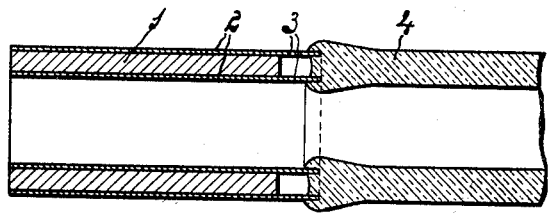
Fig. 1 is a view, in cross-section, of an iron member sealed to a glass part.

Fig. 1 shows a part of a hollow tube 1 which is chromised internally and externally to form chrome-iron layers 2. At one extremity, the iron underlying the chrome-iron layers 2 is removed by etching, for example, up to a depth of 3 mms., so that free chrome-iron cylinders 3 ensue which are sealed to a tubular glass part 4. The difference in expansion between the iron part 1 and the glass part 4 is compensated by the chrome-iron cylinders 3.

Figure 2:
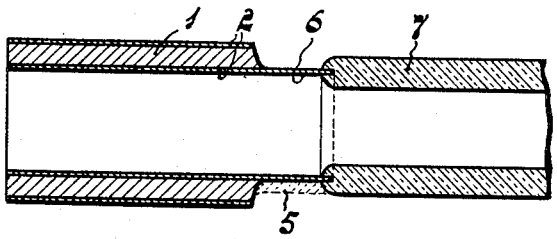
Fig. 2 is a view similar to Fig. 1 of a modification of Fig. 1.

In Fig. 2, the iron cylinder 1, covered with chrome-iron 2, is first turned, for example, in a lathe, at the end to be sealed so that the outer chrome-iron layer is removed at this area, as indicated at 5. Consequently, after etching the said end, only the inner chrome-iron cylinder 6 remains, and this cylinder 6 is sealed to a glass part 7.

If desired, the tube 1 may be welded to another metal part of an object.

Figures 3, 4:
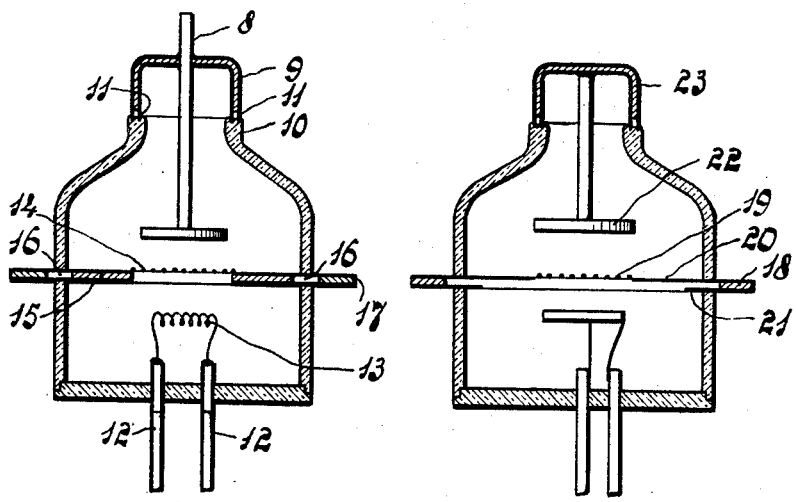
Figs. 3 and 4 show, in cross-section, electric discharge tubes in which iron members and/or electrodes are sealed to the glass wall according to the invention.

A very advantageous use of the method of the invention is shown in Fig. 3 in which a conductor 8 is led by means of a chromised iron cap 9 through a glass wall 10 of an electric discharge tube. The cap 9 is etched at its open end so that only chrome-iron cylinders 11 remain which are then sealed into the glass 10.

The principles of the invention are also applicable to parts of different shape, for example, chromised iron rods. This is exemplified by the iron lead-through conductors 12 for the cathode 13.

Furthermore, referring to Fig. 3, a grid electrode 14 is secured to an iron chromised disc 15 which is etched at 16 and sealed-in according to the invention. In order to reinforce the chrome-iron layers on the outer side of the tube, the space between the said layers may be filled up with glass or with soldering material 17 which adheres to chrome-iron.

Fig. 4 shows another discharge tube made in accordance with the invention in which the inner edge of a disc 18 is etched, grid wires 19 being secured to a projecting chrome-iron layer 20. The disc 18 may preliminarily be turned in part so that a chrome-iron layer 21 extends only through a small length inside the tube. An anode 22 is secured to the inner side of a chromised iron cap 23 which, according to the invention, is sealed into the wall of the tube and which also serves as a connecting member for the anode.

The chrome-iron layer may be provided on the iron member by heating same in an atmosphere of a volatile chromium halide so that there is an exchange of chromium atoms for iron atoms resulting in a thin chrome-iron layer.

The invention is also applicable to cathode-ray tubes, transmitting tubes and large rectifiers in which iron parts and, more particularly, those of comparatively large dimensions, are required to be sealed into glass or to glass.

Glass parts suitable for practicing the invention are commonly called lead glasses and generally have one of the following compositions:

I

| | Percent of weight |
|---|---|
| $SiO_2$ | 64.4 |
| $Na_2O$ | 13.9 |
| $PbO$ | 15.1 |
| $BaO$ | 4.3 |
| $ZnO$ | 2.3 |

II

| | Percent of weight |
|---|---|
| $SiO_2$ | 62.2 |
| $Na_2O$ | 9 |
| $PbO$ | 22 |
| $Al_2O_3$ | 1 |
| $K_2O$ | 5.8 |

III

| | Percent of weight |
|---|---|
| $SiO_2$ | 56.7 |
| $Na_2O$ | 7.6 |
| $Al_2O_3$ | 1.2 |
| $PbO$ | 30.0 |
| $K_2O$ | 4.5 |

While I have thus described my invention with specific examples and embodiments thereof, other modifications will be readily apparent to those skilled in the art without departing from the spirit and the scope of the invention as defined in the appended claims.

What I claim is:

1. A method for sealing an iron member to a lead-glass part sealable to a ferro-chromium part, which comprises the steps of coating said iron member with a metal layer consisting of about 20 to 30% chromium and the remainder iron at least on an area at which said iron member is to be sealed to said lead-glass part, thereafter removing the iron underlying the ferro-chromium metal layer at the area thereof to be sealed to said glass part so that only the layer remains, and sealing only said remaining ferro-chromium metal layer at said area to said lead-glass part.

2. A method for sealing an iron member to a lead-glass part sealable to a ferro-chromium part, which comprises the steps of heating the iron member in an atmosphere of a volatile chromium halide to form a ferro-chromium layer thereon consisting of about 25 to 30% chromium and the remainder iron, thereafter removing the iron underlying the ferro-chromium metal layer at an area at which the iron member is to be sealed to the lead-glass part so that only the layer remains, and sealing only said remaining ferro-chromium metal layer at said area to said lead-glass part.

References Cited in the file of this patent

UNITED STATES PATENTS

| Number | Name | Date |
|---|---|---|
| 2,071,597 | Vasselli | Feb. 23, 1937 |
| 2,089,541 | Dallenbach | Aug. 10, 1937 |
| 2,194,418 | Bowie | Mar. 19, 1940 |
| 2,274,999 | Allen | Mar. 3, 1942 |
| 2,396,320 | Gaudenzo | Mar. 12, 1946 |
| 2,402,029 | Dinnick | June 11, 1946 |
| 2,563,391 | Browne | Aug. 7, 1951 |
| 2,570,248 | Kelley | Oct. 9, 1951 |